(12) United States Patent
Homma et al.

(10) Patent No.: US 12,086,903 B2
(45) Date of Patent: Sep. 10, 2024

(54) DISPLAY DEVICE, DISPLAY METHOD, AND VEHICLE

(71) Applicant: Panasonic Intellectual Property Management Co., Ltd., Osaka (JP)

(72) Inventors: Hajime Homma, Kanagawa (JP); Makoto Hinata, Kanagawa (JP); Masahiro Anezaki, Kanagawa (JP); Hirotada Yaginuma, Tokyo (JP); Ayano Kawae, Tokyo (JP); Chie Hirosawa, Tokyo (JP); Xiangmei Piao, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 96 days.

(21) Appl. No.: 17/947,834

(22) Filed: Sep. 19, 2022

(65) Prior Publication Data

US 2023/0014553 A1     Jan. 19, 2023

Related U.S. Application Data

(63) Continuation of application No. PCT/JP2020/048570, filed on Dec. 24, 2020.

(30) Foreign Application Priority Data

Mar. 23, 2020   (JP) ................... 2020-050764

(51) Int. Cl.
*G06T 11/00* (2006.01)
*B60K 35/00* (2024.01)
(Continued)

(52) U.S. Cl.
CPC .............. *G06T 11/00* (2013.01); *G06F 3/013* (2013.01); *G06T 5/20* (2013.01); *G06T 5/77* (2024.01);
(Continued)

(58) Field of Classification Search
CPC ... G06T 11/00; G06T 5/77; G06T 5/20; G06F 3/013; B60K 35/28; B60K 2360/177; B60K 35/00
(Continued)

(56) References Cited

U.S. PATENT DOCUMENTS

| 10,129,439 | B2 * | 11/2018 | Murugesan | .......... H04N 1/6027 |
| 2005/0093719 | A1 * | 5/2005 | Okamoto | ........... G01C 21/3697 705/14.62 |
| 2020/0189390 | A1 * | 6/2020 | Viswanathan | ..... G01C 21/3679 |

FOREIGN PATENT DOCUMENTS

| JP | 2005-098916 | 4/2005 |
| JP | 5334159 | 11/2013 |
| JP | 6327637 | 5/2018 |

OTHER PUBLICATIONS

International Search Report (ISR) from International Searching Authority (Japan Patent Office) in International Pat. Appl. No. PCT/JP2020/048570, dated Feb. 22, 2021, together with an English language translation.

(Continued)

*Primary Examiner* — Hai Tao Sun
(74) *Attorney, Agent, or Firm* — Greenblum & Bernstein, P.L.C.

(57) ABSTRACT

A display device is disclosed. The device includes: a display that is provided to a moving body; and a display controller that controls displaying, on the display, of a virtual object corresponding to an object seen through the display from inside of the moving body, based on a positional relationship between the object and the moving body.

20 Claims, 10 Drawing Sheets

(51) Int. Cl.
  *B60K 35/28*  (2024.01)
  *G06F 3/01*   (2006.01)
  *G06T 5/20*   (2006.01)
  *G06T 5/77*   (2024.01)

(52) U.S. Cl.
  CPC .............. *B60K 35/00* (2013.01); *B60K 35/28* (2024.01); *B60K 2360/177* (2024.01)

(58) Field of Classification Search
  USPC ........................................................ 345/633
  See application file for complete search history.

(56) References Cited

OTHER PUBLICATIONS

Higuchi et al., "Succeeded in developing dimming glass that changes gradation", Japan Science and Technology Agency (https://www.jst.go.jp/pr/announce/20171017-3/index.html), Oct. 17, 2017, pp. 1-8, together with an English language translation.
English language translation of Office Action from Japan Patent Office (JPO) in Japanese Patent Appl. No. 2020-050764, dated Sep. 5, 2023.

* cited by examiner

DISPLAY DEVICE, DISPLAY METHOD, AND VEHICLE

TECHNICAL FIELD

The present disclosure relates to a display device, a display method, and a vehicle.

BACKGROUND ART

Patent Literature 1 discloses a technique for associating a picture with geographic information, such as scenery and a building, with a location where the picture was taken. According to the technique of Patent Literature 1, the picture with geographic information and information of a direction in which the picture was taken, for example, are connected to a location on a map where the picture was taken on an electronic map management server, so that a user of a display terminal, such as a cell phone and a personal computer, can see the scenery in the direction the user is actually looking.

CITATION LIST

Patent Literature

PTL 1

Japanese Patent No. 5334159

SUMMARY

Technical Problem

One non-limiting and exemplary embodiment facilitates providing a display device, a display method, and a vehicle each capable of providing a virtual object corresponding to an object such as scenery to an occupant of a moving body.

Solution to Problem

A display device according to an embodiment of the present disclosure includes: a display that is provided to a moving body; and a display controller that controls displaying, on the display, of a virtual object corresponding to an object seen through the display from inside of the moving body, based on a positional relationship between the object and the moving body.

A vehicle according to an embodiment of the present disclosure includes the display device described above.

A display method according to an embodiment of the present disclosure includes: determining a display position in displaying, on a display provided to a moving body, a virtual object corresponding to an object seen through the display from inside of the moving body, based on a positional relationship between the object and the moving body; and displaying the virtual object in the display position.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

There has been a technique disclosed for associating a picture with geographic information, such as scenery and a building, with a location where the picture was taken. The conventional technique, however, faces a challenge of providing value-added information to an occupant of a moving body since it only superimposes a picture on scenery, for example. To address the challenge, a display device according to the present disclosure provides a virtual object corresponding to an object such as scenery to an occupant of a moving body. Hereinafter, a preferred embodiment of the present disclosure will be described in detail with reference to the accompanying drawings. Note that components having substantially the same functions are denoted by the same reference signs in the present specification and drawings, and the repetitive descriptions thereof are omitted.

Embodiment

Figure 1:
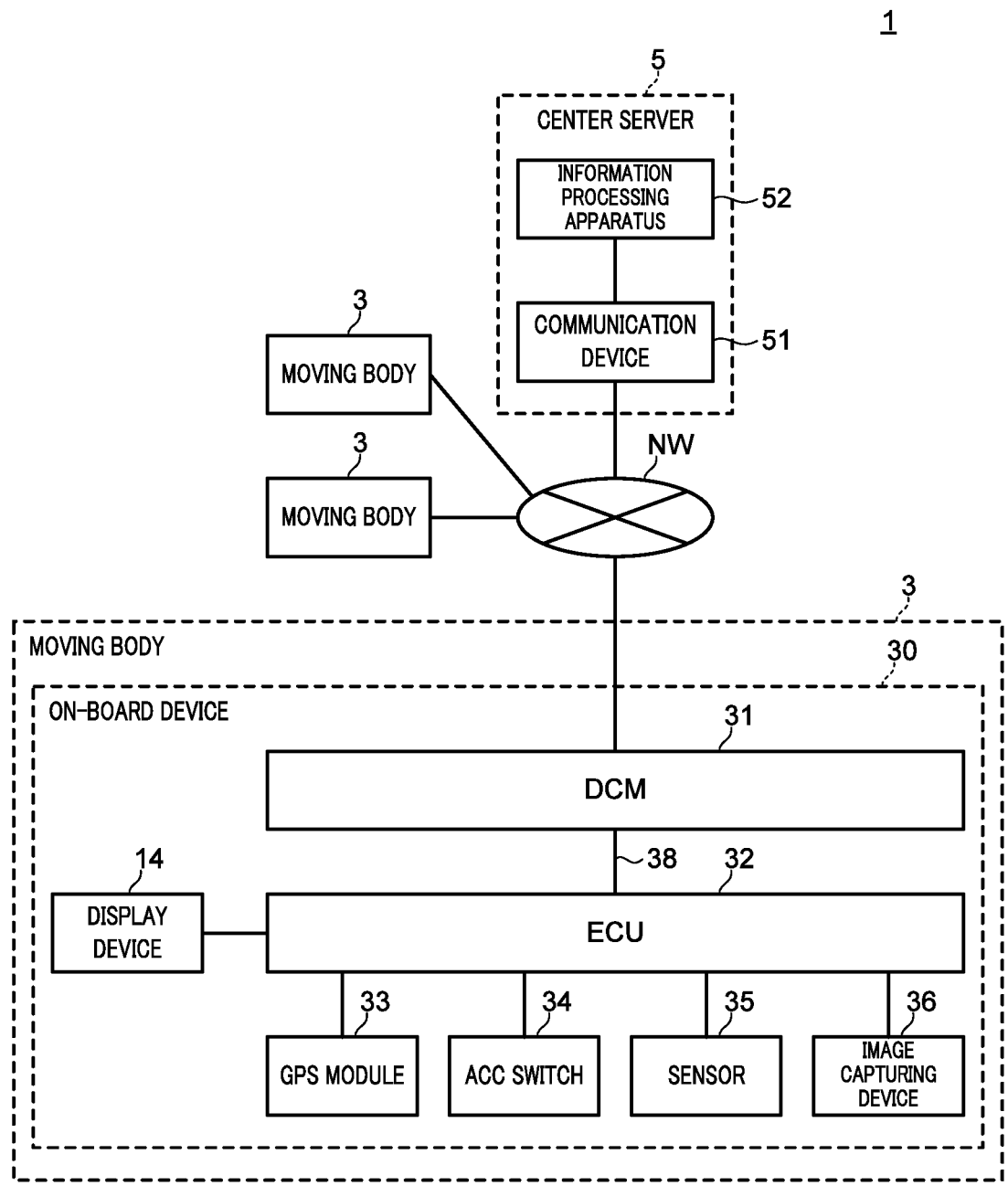
FIG. 1 illustrates an exemplary configuration of a display system according to an embodiment of the present disclosure.

FIG. 1 illustrates an exemplary configuration of a display system according to an embodiment of the present disclosure. Display system 1 includes on-board device 30 that is mounted on each of a plurality of moving bodies 3 and center server 5 that can communicate with on-board device 30. Moving body 3 is, for example, a vehicle such as a passenger car, freight car, bus, shared taxi, motorcycle, and railroad car. Note that moving body 3 is not limited to a vehicle and may be an aircraft, amusement facility, etc. In the following description, moving body 3 is a vehicle.

On-board device 30 includes data communication module (DCM) 31, electronic control unit (ECU) 32, global positioning system (GPS) module 33, accessory (ACC) switch 34, sensor 35, image capturing device 36, and display device 14, for example. Note that on-board device 30 includes, in addition to those devices, a car navigation system, audio equipment, an inverter, a motor, and auxiliary equipment, for example.

DCM 31 is a communication device that performs bidirectional communication with center server 5 via communication network NW. Communication network NW is, for example, a cellular phone network terminating at a large number of base stations, or a satellite communication network using communication satellites. In addition, DCM 31 is connected to ECU 32 via controller area network (CAN) 38, which is an in-vehicle network, to enable mutual communication, transmits various types of information to an external device of a vehicle in response to a request from ECU 32, and relays information transmitted from the external device of the vehicle to ECU 32. The external device is, for example, center server 5 and a vehicle-to-everything (V2X) communication device. The V2X is a communication technique to connect a vehicle to various objects. The V2X includes communication such as vehicle to vehicle (V2V), vehicle to pedestrian (V2P), vehicle to infrastructure (V2I), and vehicle to network (V2N).

ECU 32 is an electronic control unit that performs various types of control processing related to predetermined functions of the vehicle, and is, for example, a motor ECU, hybrid ECU, engine ECU, and the like. ECU 32 collects vehicle information and inputs the information to DCM 31, for example.

The vehicle information includes, for example, vehicle position information, speed information, vehicle status information, and captured image information. The vehicle position information is information indicating the current position of the vehicle, and is, for example, information indicating the latitude and longitude at which the vehicle is traveling. The vehicle position information is transmitted from, for example, the car navigation system and GPS module 33. The speed information is information indicating the current speed of the vehicle transmitted from a vehicle speed sensor. The vehicle status information is, for example, a signal indicating whether ACC switch 34 is ON or OFF. In addition to this, the vehicle status information includes a windshield wiper operation status, defogger status, accelerator opening, brake depression, steering volume of the steering wheel, and information obtained from advanced driver-assistance systems (ADAS). The ADAS is a system that supports a driver's driving operation in order to enhance the convenience of road traffic. The captured image information is information indicating contents of an image captured by image capturing device 36. The captured image information includes time information indicating the time of image generation.

Image capturing device 36 is a camera including an image sensor such as a charge coupled device (CCD) and complementary metal oxide semiconductor (CMOS). Image capturing device 36 includes, for example, an inside image capturing device that captures an image of the inside of the vehicle and an outside image capturing device that captures an image of the outside of the vehicle.

The inside image capturing device is placed at a position where faces of occupants of a driver's seat, a passenger's seat, a rear seat of the vehicle, for example, can be captured. Such a position includes, for example, a dashboard of the vehicle, an instrument panel of the driver's seat, and the ceiling of the vehicle. The vehicle is not necessarily provided with a single inside image capturing device, and may be provided with a plurality of inside image capturing devices. The inside image capturing device outputs captured image information indicating contents of a captured inside image of the vehicle.

The outside image capturing device may be an omnidirectional camera that captures an image of the scenery around the vehicle, and a panoramic camera, for example. The scenery around the vehicle is, for example, the scenery in front of the vehicle, the scenery on the side of the vehicle (driver's seat door side of the vehicle or passenger's seat door side of the vehicle), and the scenery behind the vehicle. The scenery includes, for example, a road on which the vehicle is traveling, an object present on the road, a sidewalk facing the road, and an object present on the sidewalk. The object present on the road is, for example, a vehicle, motorcycle, bus, taxi, building, structure (advertisement, road sign, traffic light, telegraph pole, etc.), person, animal, and fallen object. The object present on the sidewalk is, for example, a pedestrian, animal, bicycle, structure, and fallen object. The outside image capturing device is placed at a position where the scenery outside the vehicle can be captured, for example. Such a position includes a front grille, side mirror, ceiling, and rear bumper, for example. The outside image capturing device outputs captured image information indicating contents of a captured outside image of the vehicle.

GPS module 33 receives a GPS signal transmitted from satellite, measures the position of the vehicle on which GPS module 33 is mounted. GPS module 33 is communicably connected to ECU 32 via CAN 38, and the vehicle position information is transmitted to ECU 32.

ACC switch 34 is a switch that turns on and off accessory power supply of the vehicle in response to an operation of an occupant. For example, ACC switch 34 turns on and off the accessory power supply in response to an operation to a power switch provided on an instrument panel near a steering wheel of the driver's seat in the vehicle compartment. The power switch is, for example, a button switch for operating an ignition (not illustrated). An output signal of ACC switch 34 is exemplary information indicating the start and stop of the vehicle. To be more specific, when the output signal of ACC switch 34 turns an ON signal from an OFF signal, it indicates the start of the vehicle, and when the output signal of ACC switch 34 turns the OFF signal from the ON signal, it indicates the stop of the vehicle. ACC switch 34 is communicatively connected to ECU 32, for example, through CAN 38, and the status signal (ON signal/OFF signal) is transmitted to ECU 32.

Sensor 35 is, for example, a sensor detecting a voltage applied to the inverter, a sensor detecting a voltage applied to the motor, a sensor detecting a vehicle speed, a sensor detecting accelerator opening, a sensor detecting a steering volume of the steering wheel, and a sensor detecting a brake operation amount. In addition, sensor 35 may include, for example, an acceleration sensor detecting acceleration of the vehicle, and an angular velocity sensor (gyroscope) detecting angular velocity of the vehicle. Detection information outputted from sensor 35 is taken into ECU 32 through CAN 38.

Display device 14 is, for example, a transparent liquid crystal display or transparent organic electroluminescence (EL) display with light transmission and dimming properties. Display device 14 is provided to a vehicle window, for example. The vehicle window includes a windshield, side windows, and a rear window, for example. Note that display device 14 may be provided to, besides the vehicle window, a window installed in a boarding door of a railroad car, window installed near a seat of a railroad car, cockpit window of an aircraft, cabin window of an aircraft, and the like. An exemplary configuration of display device 14 will be described later. The vehicle window also includes the front, rear, left, and right sides and the ceiling of the vehicle all composed of display device 14 or glass. Further, the vehicle window includes a window entirely composed of display device 14 (transparent liquid crystal display), i.e., composed without glass (window composed of a transparent liquid crystal display only). Note that the configuration of display device 14 is not limited to the above examples, and display device 14 may have a configuration where a light-dimming film whose light transmission changes electronically, for example, is laminated to a transparent liquid crystal display, transparent organic EL display, transparent micro LED, or transparent screen film that forms a projector image. The film laminated to the glass is placed within, for example, 90% of the outer shape of the glass visible from the inside of the vehicle. This makes the film have an additional function of preventing the glass from shattering when a person is trapped inside the vehicle and breaks the window to escape.

Center server 5 is a server that provides various services by collecting information from a plurality of vehicles and distributing information to occupants of the plurality of vehicles. The various services include, for example, a car sharing service, authentication key service, trunk delivery service, B2C car sharing service, and advertisement distribution service.

Center server 5 includes communication device 51 and information processing apparatus 52. Communication device 51 is a communication device that performs bidirectional communication with each of the plurality of vehicles via communication network NW under the control of information processing apparatus 52. Information processing apparatus 52 performs various types of control processing in center server 5. Information processing apparatus 52 is composed of a server computer including, for example, a central processing unit (CPU), random access memory (RAM), read only memory (ROM), auxiliary storage device, and input/output interface.

Figure 2:
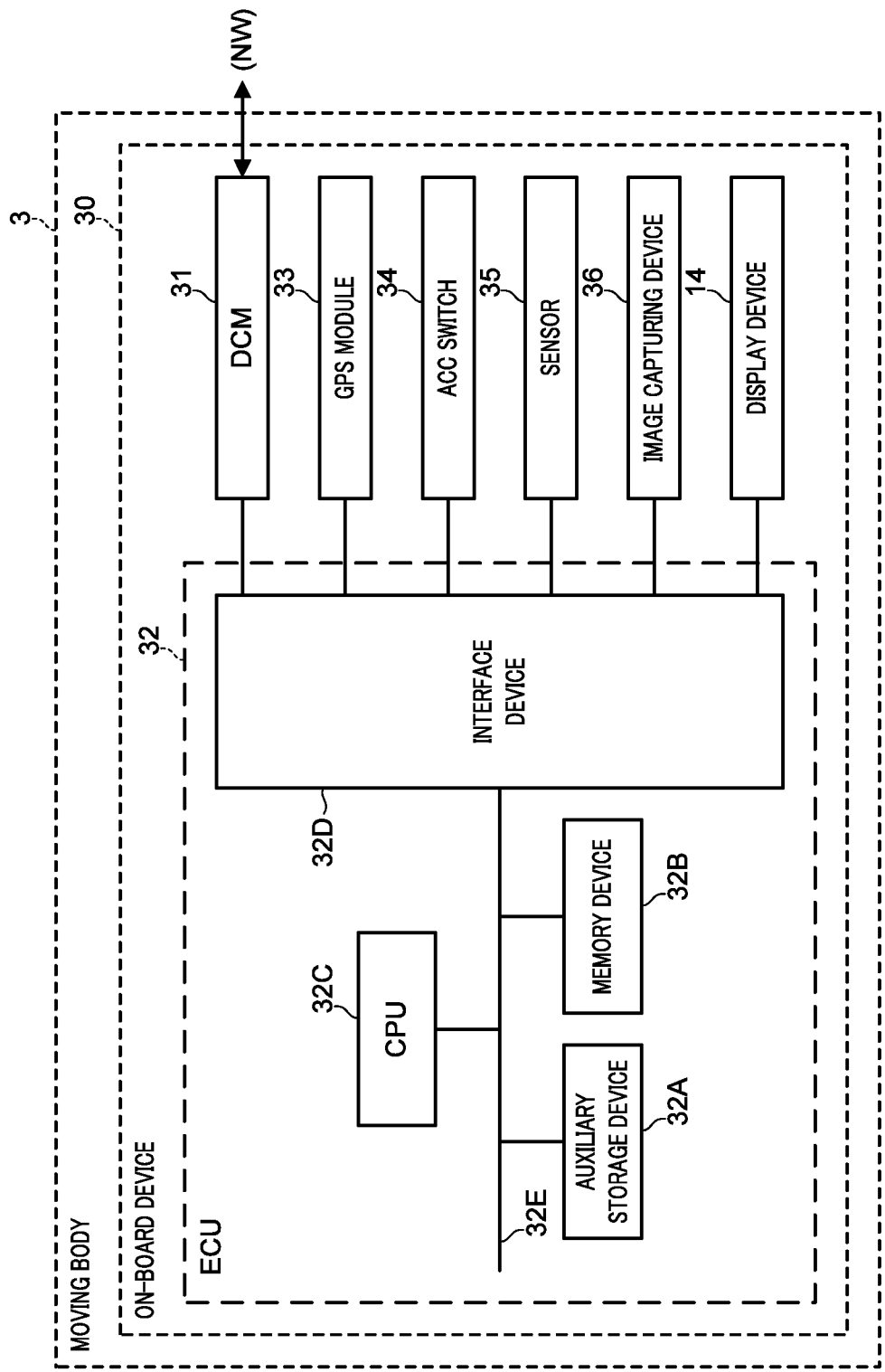
FIG. 2 illustrates an exemplary hardware configuration of an electronic control unit (ECU) of an on-board device.

Next, an exemplary hardware configuration of ECU 32 of on-board device 30 will be described with reference to FIG. 2. FIG. 2 illustrates the exemplary hardware configuration of the ECU of the on-board device. ECU 32 includes auxiliary storage device 32A, memory device 32B, CPU 32C, and interface device 32D. These are connected to each other through bus line 32E.

Auxiliary storage device 32A is a hard disk drive (HDD) or flash memory that stores, for example, a file and data necessary for processing in ECU 32. When a program starting indication is present, memory device 32B reads a program from auxiliary storage device 32A and stores the program. CPU 32C executes the program stored in memory device 32B and implements various functions of ECU 32 according to the program. Interface device 32D is, for example, an interface that connects CPU 32C to DCM 31 via CAN 38, and connects image capturing device 36, sensor 35, etc. to DCM 31 via CAN 38.

Figure 3:
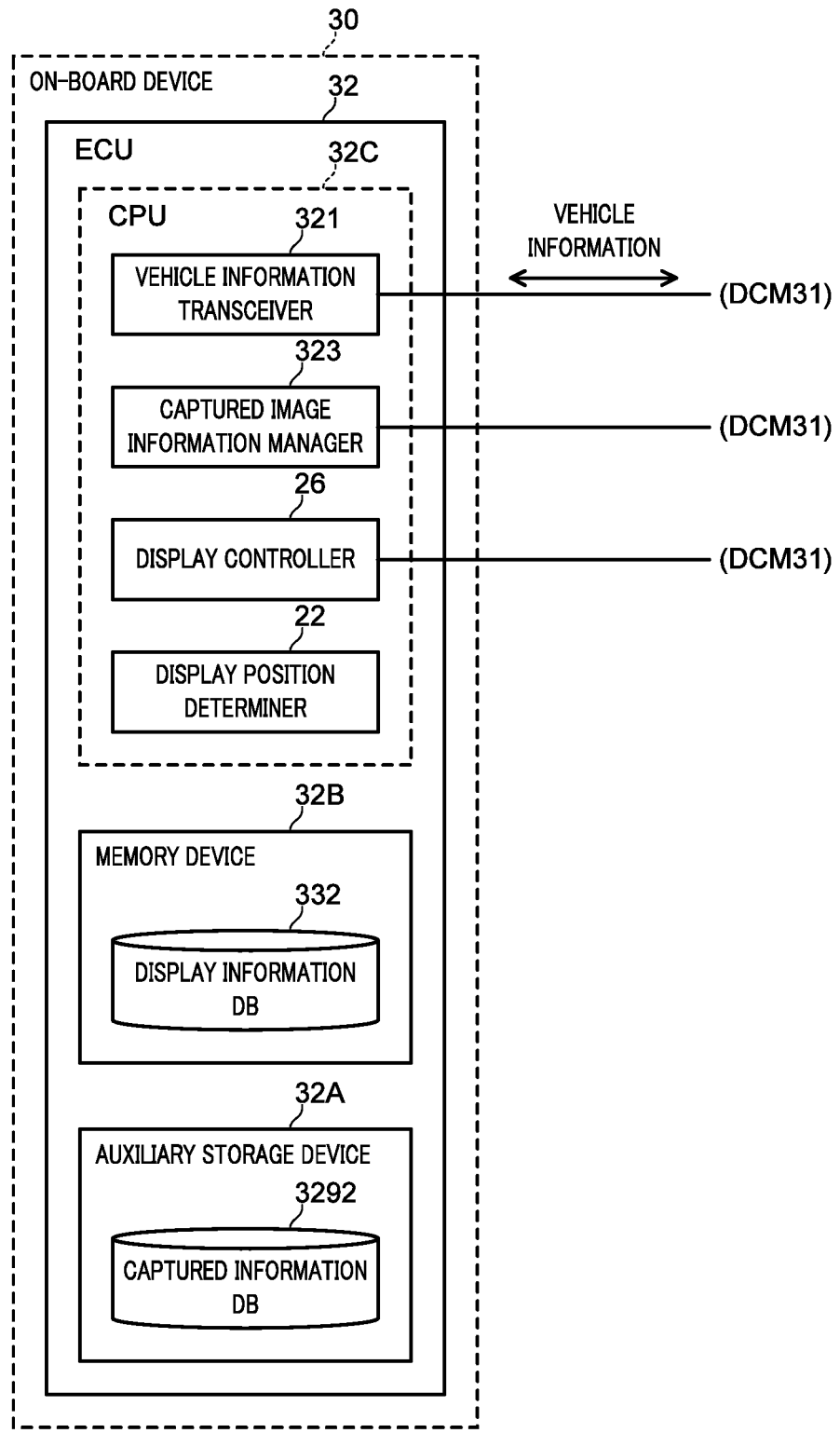
FIG. 3 illustrates an exemplary functional configuration of the ECU of the on-board device.

Next, functions of ECU 32 of on-board device 30 will be described with reference to FIG. 3. FIG. 3 illustrates an exemplary functional configuration of the ECU of the on-board device.

Memory device 32B includes display information DB 332 that stores display information to be displayed on display device 14. The display information is information indicating contents of a virtual object. Specific examples of the virtual object will be described later.

CPU 32C of ECU 32 includes vehicle information transceiver 321, captured image information manager 323, display position determiner 22, and display controller 26 performing display control of display device 14.

Vehicle information transceiver 321 has a function of receiving vehicle information and a function of transmitting the vehicle information to center server 5.

Display position determiner 22 determines the display position of display information on display device 14. Display position determiner 22 is used in a case of, for example, displaying the display information in association with the occupant's line of sight so as to superimpose the display information on the scenery through the display on display device 14. An exemplary method of determining the display position of the display information will be described below.

First, display position determiner 22 extracts, for example, a face of an occupant from an inside image of the vehicle transmitted by the inside image capturing device, and specifies the position of the occupant who watches a screen of display device 14 based on the position and direction of the occupant's face in the vehicle and the vehicle position.

Next, display position determiner 22 specifies, for example, the position where the screen of display device 14 is provided in the vehicle as the screen position. For example, the position of the screen of display device 14 is determined when display device 14 is installed in the vehicle, and thus, information indicating the position of the screen of display device 14 is linked to vehicle identification information corresponding to the vehicle, and the linked information is stored in memory device 32B, for example. The vehicle identification information is, for example, a vehicle index number or vehicle identifier (ID). When on-board device 30 is activated, display position determiner 22 refers to memory device 32B and reads the screen position of display device 14 using the vehicle identification information. This process makes it possible to specify that the screen of display device 14 is provided to, for example, a windshield, side window, or the like.

Note that the position where the screen of display device 14 is provided can be configured more in detail. For example, when display device 14 is provided in a partial area of a windshield, the entire area of the windshield viewed flat from the inside of the vehicle toward the front may be divided into four areas of the first quadrant to the fourth quadrant of the rectangular coordinates, for example, identification information of each area may be linked to the vehicle identification information, and the linked information may be stored in memory device 32B or the like. This allows display position determiner 22 to specify that display device 14 is placed, for example, in an area near the upper left of the windshield, an area near the lower right of the windshield, or the like.

Next, display position determiner 22 specifies the display position of the display information in the scenery through the display screen. To be more specific, display position determiner 22 extracts, for example, a building from outside images of the vehicle in two frames that are continuously captured, and calculates the distance from the outside image capturing device to the building by the principle of stereo camera, based on the difference in the position of the building in the outside images between the two frames. Display position determiner 22 then specifies the position of the building based on the distance from the outside image capturing device to the building and the vehicle position. Subsequently, display position determiner 22 refers to display information DB 332 to determine whether the display information associated with the position of the building is present in display information DB 332. When the display information is present, display position determiner 22 specifies the position of the building as the display position of the display information.

Note that display position determiner 22 may be configured to specify the display position of the display information by another method. For example, display position determiner 22 calculates a range of latitude and longitude corresponding to the area of the scenery included in the outside image of the vehicle, based on the vehicle position and a capturing range of the outside image capturing device. Display position determiner 22 then specifies the display position of the display information by searching display information DB 332 for the display position of the display information within the calculated range of latitude and longitude.

Finally, display position determiner 22 determines the display position of the display information based on the specified current position of the occupant, the specified screen position, the specified display position of the display information, etc. Methods of determining the display position will be described later in detail.

Captured image information manager 323 generates a captured image information table (captured image information DB 3292) by inputting the captured image information transmitted from image capturing device 36 for a certain period while embedding the time and vehicle position information in the transmitted captured image information.

Figure 4:
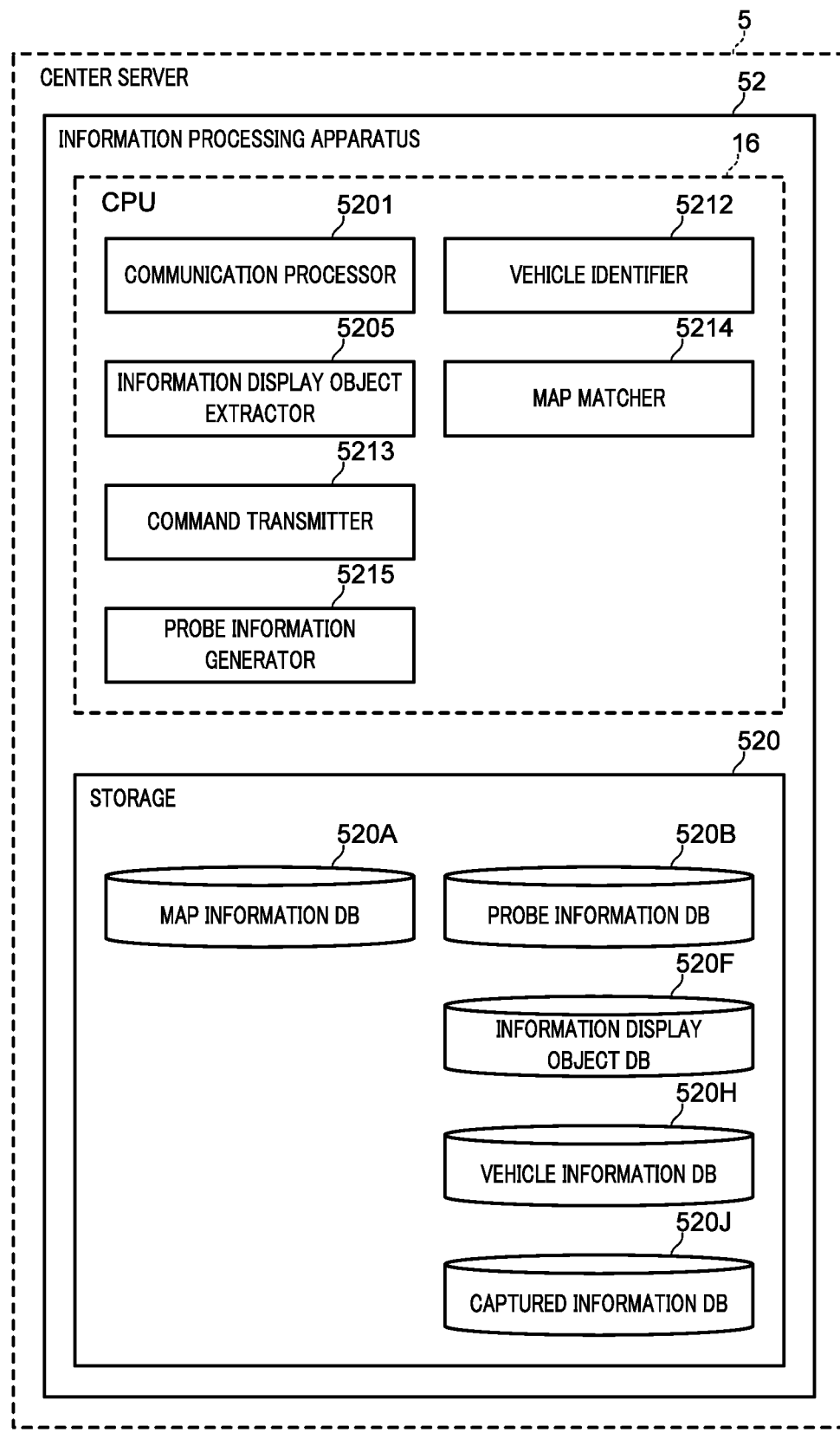
FIG. 4 illustrates an exemplary hardware configuration and an exemplary functional configuration of an information processing apparatus of a center server.

Next, an exemplary hardware configuration of the information processing apparatus of the center server, for example, will be described with reference to FIG. 4. FIG. 4 illustrates the exemplary hardware configuration and an exemplary functional configuration of the information processing apparatus of the center server. Information processing apparatus 52 includes CPU 16 and storage 520.

CPU 16 includes communication processor 5201 that transmits and receives various kinds of information to and from each of a plurality of vehicles, information display object extractor 5205, vehicle identifier 5212, command transmitter 5213, map matcher 5214, and probe information generator 5215. Storage 520 includes map information DB 520A, probe information DB 520B, information display object DB 520F, vehicle information DB 520H, and captured image information DB 520J.

Information display object extractor 5205 extracts, based on the known image recognition processing, an information display object from the captured image information of image capturing device 36 included in probe information of each of the plurality of vehicles stored in probe information DB 520B. Information display object extractor 5205 then adds specific identification information to the extracted information display object, links meta-information, such as an image of the information display object and position information of the information display object, to the identification information, and stores the information display object in information display object DB 520F. Accordingly, information on the information display object extracted by information display object extractor 5205 is registered in information display object DB 520F in addition to information on the pre-registered information display object such as a signboard or digital signage on which advertisement information of a predetermined advertiser is displayed. This enhances the information display object, thereby improving convenience for an occupant. Note that the position information of the information display object added as the meta-information may be the vehicle position information itself included in the probe information that also includes the captured image information, which is a source of the extraction, or may be the position information considering the position information of the information display object relative to the vehicle calculated from the captured image information. When the extracted information display object is the same as the information display object already registered in information display object DB 520F, information display object extractor 5205 does not store information on the extracted information display object in information display object DB 520F. This processing by information display object extractor 5205 may be performed in real time in response to the probe information sequentially received from each of the plurality of vehicles by communication processor 5201, or may be performed periodically on a certain amount of accumulated, unprocessed probe information.

Vehicle identifier 5212 identifies a vehicle passing through a geographic position or area where the captured image information is to be collected, based on the vehicle position information. Note that the latest captured image of a field where the vehicle actually travels is necessary for creating a three-dimensional advanced dynamic map to be used for autonomous driving of the vehicle. The field for which this dynamic map is created can be an example of the geographical position or area where the captured image information is to be collected.

For example, when the vehicle position information transmitted from each of a plurality of vehicles is inputted, vehicle identifier 5212 matches the vehicle position information to the position or area where the captured image information is collected, and determines the vehicle that has passed through the position or area. Then, vehicle identifier 5212 selects vehicle information including the position information of the vehicle that is determined to have passed through from the vehicle information transmitted from each of a plurality of on-board devices 30, and extracts the vehicle identification information included in the selected vehicle information. After extracting the vehicle identification information, vehicle identifier 5212 transfers the extracted vehicle identification information to command transmitter 5213.

After the vehicle identification information is inputted to command transmitter 5213 from vehicle identifier 5212, command transmitter 5213 transmits a captured image information request command to the vehicle to which the vehicle identification information is assigned from a group of vehicles communicably connected to center server 5 via communication network NW. The captured image information provided in response to the captured image information request command is associated with data collection target area information, and is stored in storage 520 as captured image information DB 520J.

Map matcher 5214 specifies a link of a road where the vehicle is currently located based on map information DB 520A and the vehicle position information. Map information DB 520A is composed of geographic information system (GIS) data and the like. The GIS data includes a node corresponding to an intersection, a road link connecting nodes, a line and polygon corresponding to buildings, roads, or other geographic features. For example, identification information, i.e., link ID, is defined in advance for each of a plurality of road links that are included in map information DB 520A and compose a road network. Map matcher 5214 identifies the link ID of the road link where the vehicle is currently located by referring to map information DB 520A.

Probe information generator 5215 generates probe information including the vehicle information transmitted from the vehicle, time information, and the road link specified by map matcher 5214, at predetermined intervals. Then, probe information generator 5215 stores the generated probe information in probe information DB 520B.

Figure 5:
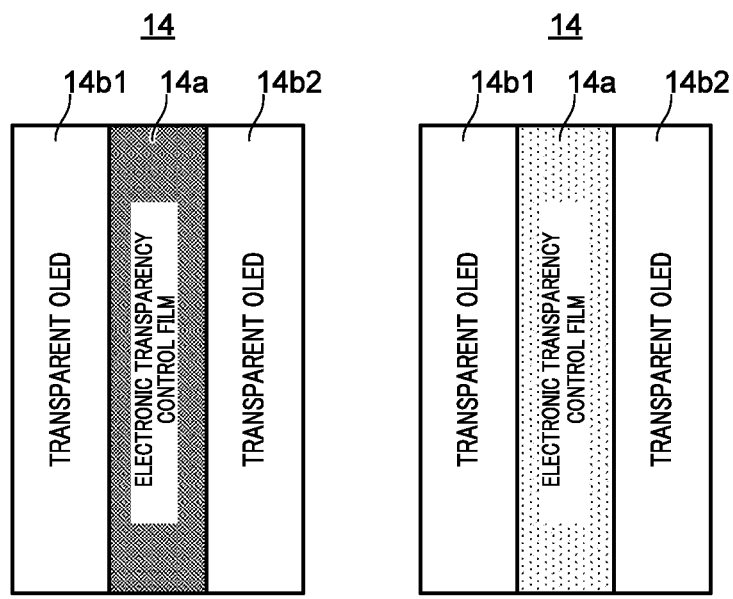
FIG. 5 is a cross-sectional view of a display device.

Next, an exemplary configuration of display device 14 will be described with reference to FIG. 5. FIG. 5 is a cross-sectional view of the display device. Display device 14 is provided on a vehicle, for example, being attached to the inside or outside of a vehicle window. Note that display device 14 is not necessarily provided on a vehicle in this way. For example, display device 14 may be fixed to a frame of the vehicle so that the screen of display device 14 faces the inside or outside of the vehicle window. Display device 14 may also be embedded in the vehicle window. Further, display device 14 may be provided so as to cover the entire area of the vehicle window, or may be provided so as to cover a partial area of the vehicle window.

Display device 14 has a configuration in which two transparent OLEDs 14b1 and 14b2 have electronic transparency control film 14a in between, for example. Hereinafter, two transparent OLEDs 14b1 and 14b2 are collectively referred to as "transparent OLED" when they are not distinguished from each other. Electronic transparency control film 14a is an example of a transmissive display whose transparency is changeable. Transparent OLED 14b1 and transparent OLED 14b2 are examples of a display information display capable of displaying the display information.

Electronic transparency control film 14a is capable of controlling the shading of scenery seen through the display of the vehicle and controlling the shading of an image displayed on the transparent OLED by changing the transparency (visible light transmission), for example. Electronic transparency control film 14a may be capable of uniformly changing the transparency of entire electronic transparency control film 14a, or may be capable of changing the transparency of a partial area of electronic transparency control film 14a. Exemplary methods of changing the transparency of electronic transparency control film 14a are an electrochromic method, a gas chromic method that enables high-speed dimming control compared to the electrochromic method, and the like. When the transparency of a partial area of electronic transparency control film 14a is changed, a local dimming technique or a technique disclosed in Non Patent Literature 1 can be used (Non Patent Literature 1: https://www.jst.gojp/pr/announce/20171017-3/index.html).

Transparent OLED 14b1 is an exemplary transparent display directed toward a first end face side of electronic transparency control film 14a. The first end face side of electronic transparency control film 14a is, for example, the inside of a window. Transparent OLED 14b2 is an exemplary transparent display directed toward a second end face side of electronic transparency control film 14a that is the opposite side of the first end face side. The second end side of electronic transparency control film 14a is the outside of a vehicle. Note that display device 14 may include a transparent liquid crystal display instead of the transparent OLED.

Display device 14 provided with two transparent OLEDs is capable of displaying different display information inside and outside the window.

For example, when an occupant enjoys playing a game in a vehicle during autonomous driving, the transparency of electronic transparency control film 14a may be reduced (e.g., visible light transmission of 30% or less) as illustrated on the left side of FIG. 5 to display the game screen on transparent OLED 14b1 and display an enlarged character of the game on transparent OLED 14b2, for example.

When an occupant enjoys exercising, such as yoga or shadow boxing, in a vehicle during autonomous driving, the transparency of electronic transparency control film 14a may be reduced as illustrated on the left side of FIG. 5 to display an instruction video of the exercise on transparent OLED 14b1 and display a moving image of a person exercising in the vehicle on transparent OLED 14b2.

It is also possible to display a navigation screen, such as a map, on transparent OLED 14b1 and to display an advertising image, for example, on transparent OLED 14b2 while the transparency of electronic transparency control film 14a is reduced.

In addition, the transparency of electronic transparency control film 14a may be increased (e.g., visible light transmission of 80% or more) as illustrated on the right side of FIG. 5 to display a navigation screen, such as a map, on transparent OLED 14b1 of display device 14 provided to a windshield. By not displaying display information on transparent OLED 14b2 of display device 14, it is possible to superimpose the navigation screen on the scenery through the windshield.

The two transparent OLEDs may display the display information different from each other, or may display the same or similar display information. When an occupant enjoys exercising in a vehicle during autonomous driving, for example, the transparency of electronic transparency control film 14a may be reduced to display only an instruction video on transparent OLED 14b1 and display two screens of the instruction video and a moving image of an exercising person on transparent OLED 14b2.

Note that the configuration of display device 14 is not limited to the illustrated example. For example, display device 14 may be configured to include only one transparent OLED of the two transparent OLEDs.

The transparency of display device 14 can be changed based on traveling information on traveling of a moving body. The traveling information on traveling of a moving body includes, for example, speed information of a vehicle (vehicle speed), weather information around the current position of a vehicle, current time information, vehicle status information, traffic information, and information indicating a vehicle traveling mode. The transparency of display device 14 can be changed in phases or continuously. Examples of changing the transparency will be described below.

In a case of changing the transparency based on the vehicle speed, display controller 26 uses, for example, table information in which the vehicle speed and the transparency are associated with each other. The table information may be stored in memory device 32B in advance or may be distributed from center server 5. After vehicle speed information is inputted, display controller 26 refers to the table information, configures a first transparency in a case of a first speed range, and configures a second transparency, which is lower than the first transparency, in a case of a second speed range, which is higher than the first speed range, for example. The first transparency is, for example, the visible light transmission of 80%. The second transparency is, for example, the visible light transmission of 30%. The first speed range is, for example, a speed from 0 km/h to 80 km/h. The second speed range is, for example, a speed of 80 km/h or higher. With this configuration, even when the vehicle travels in a town at a speed in the first speed range in the autonomous driving mode and needs to avoid an obstacle, for example, the driver can visually recognize the scenery through the display, and this enables an immediate operation to avoid the obstacle. When the vehicle travels on a bypass road or highway, for example, at a speed in the second speed range in the autonomous driving mode, the driver hardly needs to avoid an obstacle. Thus, blocking the scenery through the display allows the occupant to concentrate on listening to the music, reading, etc. Note that the transparency may be changed in phases according to the vehicle speed, or may be changed continuously according to the vehicle speed. For example, in the first speed range, the transparency may be continuously reduced as the vehicle speed increases from 0 km/h to 80 km/h. Further, in the case where the transparency is changed based on the vehicle speed, display controller 26 may configure the transparency to be higher for a far section where the scenery hardly changes (upper section of a window), and may configure the transparency to be lower for a section where the scenery frequently changes (lower section of a window).

In a case of changing the transparency based on the weather, display controller 26 can change the transparency using, for example, weather information distributed on the Internet, information of a windshield wiper operation state, information of a defogger operation state, and the like. In clear weather, for example, configuring the transparency of entire display device 14 to be around 50% enhances the sense of immersion in the displayed image without the driver and the passenger feeling bright. In cloudy weather, the visibility is deteriorated compared to the case of clear weather, and thus display controller 26 increases the transparency in the area below the center of display device 14, and reduces the transparency in the area above the center of display device 14, for example. With this configuration, a partial area of display device 14 is shaded and the remaining area is not shaded, so that the condition outside the vehicle can be confirmed. This allows the driver to grasp the traffic condition while reducing brightness caused by diffuse reflection of clouds, thus enabling an operation to avoid a pedestrian running out into a road, for example. In addition, the passenger can enjoy the display image or the like. In rainy weather, the visibility is even more deteriorated than the case of cloudy weather, and thus display controller 26 configures the visible light transmission of entire display device 14 to a higher transparency around 80%, for example. This makes it easier to recognize a traffic light, intersection, surrounding vehicle, etc. even in the condition where rain causes poor visibility, thus enabling an operation to avoid a pedestrian running out into a road, for example. In addition, even in a situation where display device 14 provided to the windshield has a high transparency, the passenger can still enjoy the display image, for example, by configuring a low transparency for display device 14 provided to the side window or the like.

In a case of changing the transparency based on the time, for example, the transparency can be changed according to the time by using table information in which time periods, such as early morning, daytime, night, midnight, etc., are associated with a plurality of transparencies different for respective time periods. The table information may be stored in memory device 32B in advance or may be distributed from center server 5. For example, after the time information is inputted, display controller 26 refers to the table information, and configures the transparency of entire display device 14 to be around 50% in the early morning and in the daytime in order to reduce brightness toward the driver or the like. Further, display controller 26 configures the transparency of entire display device 14 to be around 80% at night and midnight in order to ensure the visibility.

In addition, display controller 26 may compare the brightness inside the vehicle with the brightness outside the vehicle, and configure the transparency to be lower only when the inside of the vehicle is brighter than the outside of the vehicle. The comparison between the brightness inside the vehicle and the brightness outside the vehicle is performed by comparing the average luminance level before the white balance adjustment of the outside image capturing device that captures an image of the outside of the vehicle during autonomous driving with the average brightness level before the white balance adjustment of the inside image capturing device that captures an image of the inside of the vehicle.

In a case of changing the transparency based on vehicle status information, for example, a plurality of table information portions are prepared for respective types of the vehicle status information, and each of the table information portions is associated with transparencies with respect to accelerator opening, a brake depression amount, a steering amount of a steering wheel, for example. The table information may be stored in memory device 32B in advance or may be distributed from center server 5.

After information on the accelerator opening is inputted, when the accelerator opening is small, for example, display controller 26 configures the transparency in the area below the center of display device 14 to be around 80%, and configures the transparency in the area above the center of display device 14 to be around 30%. With this configuration, a partial area of display device 14 is shaded when the vehicle cruises on a highway at a constant speed, for example, thereby reducing brightness due to sunlight toward the driver. In addition, the passenger can enjoy an image displayed in the area with lower transparency.

After information on the accelerator opening is inputted, when the accelerator opening is large, for example, display controller 26 configures the transparency of entire display device 14 to be around 80%. With this configuration, display device 14 is not shaded when the vehicle travels on a steep uphill with a series of curves such as a mountain road, for example. This contributes to the driver's safe driving, and allows the passenger to enjoy a display image superimposed on the scenery.

After information on the brake depression amount is inputted, when the number of brake applications in a certain time period is small or when the brake depression amount in a certain time period is small, for example, display controller 26 configures the transparency in the area below the center of display device 14 to be around 80%, and configures the transparency in the area above the center of display device 14 to be around 30%. With this configuration, a partial area of display device 14 is shaded when the vehicle cruises on a highway, for example, thereby reducing brightness due to sunlight toward the driver. In addition, the passenger can enjoy an image displayed in the remaining area.

After information on the brake depression amount is inputted, when the number of brake applications in a certain time period is large or when the brake depression amount in a certain time period is large, for example, display controller 26 configures the transparency of entire display device 14 to be around 80%. With this configuration, display device 14 is not shaded when the vehicle travels in an urban area with heavy traffic, for example. This contributes to the driver's safe driving, and allows the passenger to enjoy a display image superimposed on the scenery.

After information on the steering amount of the steering wheel is inputted, when the number of times the steering wheel is steered in a certain time period is small or when the steering amount of the steering wheel in a certain time period is small, for example, display controller 26 configures the transparency in the area below the center of display device 14 to be around 80%, and configures the transparency in the area above the center of display device 14 to be around 30%. With this configuration, a partial area of display device 14 is shaded when the vehicle cruises on a highway, for example, thereby reducing brightness due to sunlight toward the driver. In addition, the passenger can enjoy an image displayed in the remaining area.

After information on the steering amount of the steering wheel is inputted, when the number of times the steering wheel is steered in a certain time period is large or when the steering amount of the steering wheel in a certain time period is large, for example, display controller 26 configures the transparency of entire display device 14 to be around 80%. With this configuration, display device 14 is not shaded when the vehicle travels in an urban area with heavy traffic, for example. This contributes to the driver's safe driving, and allows the passenger to enjoy a display image superimposed on the scenery.

In a case of changing the transparency based on traffic information, display controller 26 may change the transparency of display device 14 according to the road congestion status. To be more specific, when traffic information distributed while traveling on a highway indicates that the road on which the vehicle is traveling is congested for several minutes, the vehicle speed decreases for a short time. Thus, display controller 26 configures the transparency to be around 80% so that the passenger, for example, can enjoy the scenery through the display. Meanwhile, when the road on which the vehicle is traveling is congested for several tens of minutes or longer, low-speed traveling is forced for a relatively long time. In this case, display controller 26 configures the transparency to be around 30% so that the driver of the vehicle, for example, enjoys a display image, and changes the transparency from around 30% to around 80% when the traffic congestion is cleared.

In a case of changing the transparency based on information indicating a vehicle traveling mode, display controller 26 changes the transparency depending on, for example, whether the vehicle is in a manual driving mode or an autonomous driving mode (including a driving assist mode, semi-autonomous driving mode, etc.). When the manual driving mode is selected, display controller 26 may change the transparency depending on an eco-driving mode capable of fuel-efficient driving, a sport driving mode capable of active driving, etc. In addition to the above, display controller 26 may configure the transparency of all windows to be reduced when, for example, the vehicle is used as a complete private space by occupant's selection.

Note that display device 14 may be electronic transparency control film 14a combined with a head-up display. In this case, information projected from the head-up unit is projected onto electronic transparency control film 14a provided to a window via a reflective mirror, for example, so that the information can be visually recognized by the driver as a virtual image. At this time, the driving can be finely assisted by changing the transparency of electronic transparency control film 14a depending on the traveling condition. For example, when the vehicle travels on a snow road, display device 14 configures the transparency of a partial area of entire electronic transparency control film 14a on which a virtual image is projected to be lower than the transparency of the other areas, thereby clearly displaying the virtual image superimposed on the snow road.

Note that the head-up display includes a special film similar to a one-way mirror attached to a surface near the passenger, a special film-like material placed inside the glass as an intermediate layer, etc. in order to facilitate visual recognition of a virtual image on the head-up display. In particular, a head-up display using a special film similar to a one-way mirror almost serves as a mirror when the outside of the vehicle is darker than the inside of the vehicle. That is, the interior of the vehicle is reflected in the one-way mirror in a situation where the outside of the vehicle is darker than the inside of the vehicle. Thus, although increasing the luminance of the above transparent OLED worsens the contrast of the transparent OLED, it is better to display an image by partially reducing the transmission of only a display section of the head-up display after adjusting the image by increasing the black level (black luminance), or making the image without black. Besides the special film similar to a one-way mirror described above, a holographic optical element (HOE) that diffracts only a certain wavelength can also be exemplified, and this case eliminates the need for the above-described image adjustment.

In addition to the above, display controller 26 may change the transparency by using, for example, information distributed in V2X communication. The V2X communication enables not only vehicle-to-vehicle communication but also communication between a vehicle and a person having a communication terminal, communication between a vehicle and a roadside unit, etc. The V2X communication provides, for example, information indicating a traffic light status, traffic regulation information, traffic obstacle information (information on icy road surfaces, flooded roads, falling objects on roads, etc.), and position information of a moving object present around the vehicle. For example, when a vehicle equipped with display device 14 turns right and a moving body, such as a bicycle or a motorcycle, approaches the vehicle from behind, using the above information makes it possible to display the moving body on display device 14 in real time. It is also possible to make the driver visually recognize the moving body by display controller 26 switching the transparency of electronic transparency control film 14a provided to a side window, for example, from low to high when the distance between the moving body and the vehicle is shorter than a configured distance. When it is determined that the moving body cannot avoid colliding with vehicle, display controller 26 may display a warning message on display device 14. To be more specific, by using captured image information acquired from the outside image capturing device, for example, display controller 26 displays an image of the moving body approaching the vehicle on display device 14 in real time, and also estimates the approaching speed of the moving body toward the vehicle based on the position of the moving body present around the vehicle, the movement amount of the moving body per unit time, and the like. When it is determined from the estimated speed that the moving body cannot avoid colliding with vehicle, display controller 26 displays a warning message on display device 14. In addition, when receiving flood information, display controller 26 can determine the flooded area, the amount of flooding, and detour routes to bypass the flooded area, for example, in cooperation with a navigation system, and display the determined information on display device 14.

Further, the transparency of display device 14 may be changed according to the pattern of a display content of a virtual object, the attribute of an occupant, or the like. Specific examples of the display content of a virtual object will be described later.

Next, exemplary displays of a virtual object will be described with reference to FIGS. 6 to 11. Note that the virtual object may include, for example, an augment reality (AR) object, virtual reality (VR) object, substitutional reality (SR) object, and mixed reality (MR) object. The AR is a technique for providing new perception by superimposing information on an object or the like in real space. The VR is a technique for building reality (realism) on virtual space. The SR is a technique for seamlessly replacing information stored in the past with information available in the present. The MR is a technique for building reality on a mixture of real and virtual space. The AR object is an object in which an image created by rendering based on spatial information about a particular object is faded into, or superimposed on, an image of scenery. The VR object is a virtualized object, such as a computer graphics image created based on a high-definition 3D map, an object image embedded in a moving image captured during traveling, etc.

Figure 6:
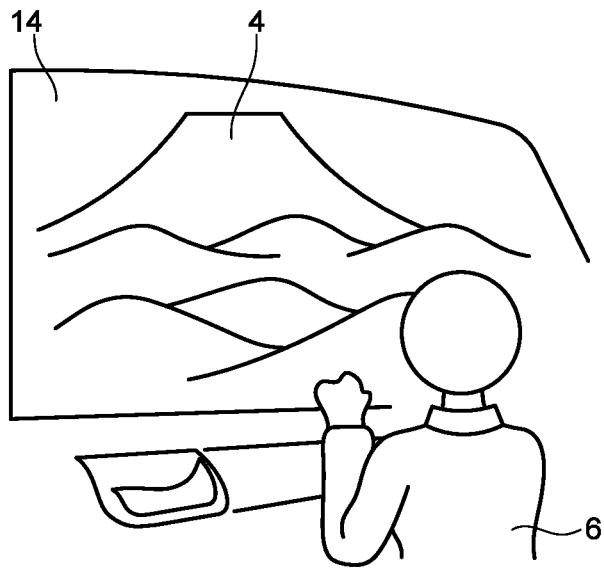
FIG. 6 illustrates scenery displayed on the display device provided to a window of a vehicle.

FIG. 6 illustrates scenery displayed on the display device provided to a window of the vehicle. FIG. 6 illustrates an image of mountain 4 as exemplary scenery through the display. Note that the scenery through the display may be an image of scenery captured by image capturing equipment or may be scenery that occupant 6 actually sees through the display from inside the vehicle.

Figure 7:
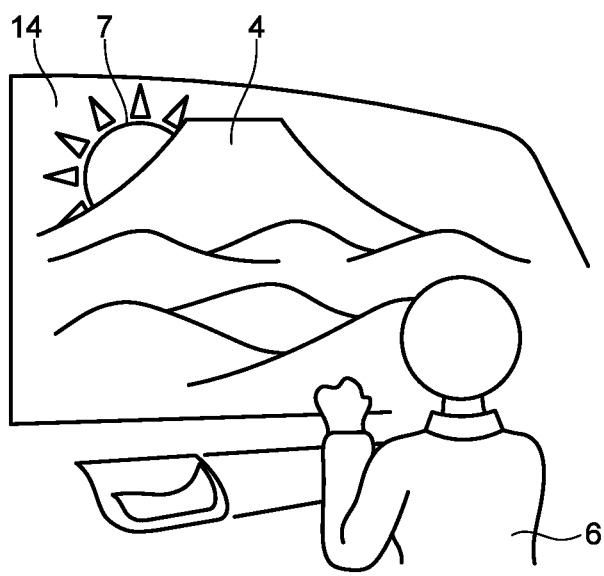
FIG. 7 illustrates a state where an AR object is combined with a mountain in FIG. 6.

FIG. 7 illustrates a state where an AR object is combined with the mountain in FIG. 6. Combining AR object 7, which is a deformed sun, with actual mountain 4 enhances the sense of immersion of occupant 6 in the display information.

Figure 8:
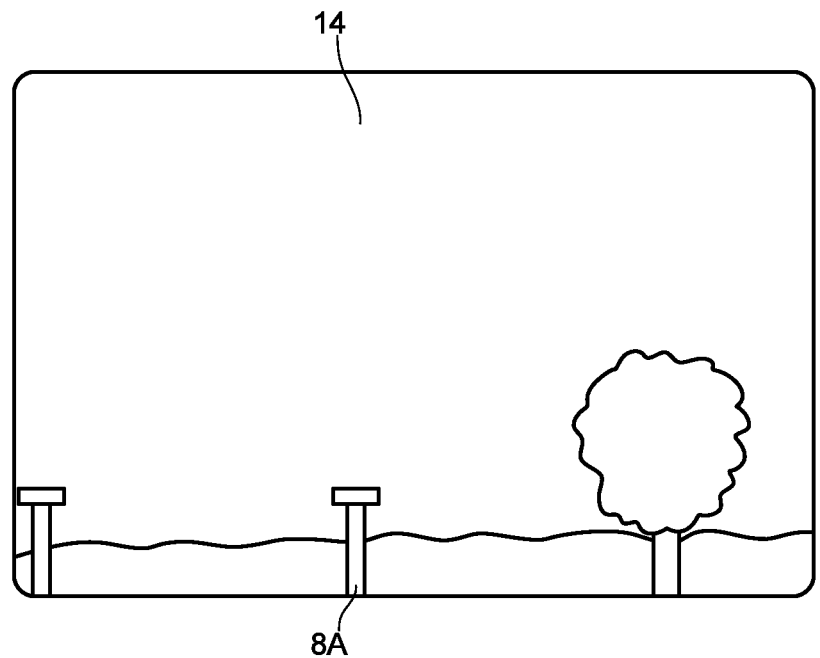
FIG. 8 illustrates scenery displayed on the display device provided to the window of the vehicle.
Figure 9:
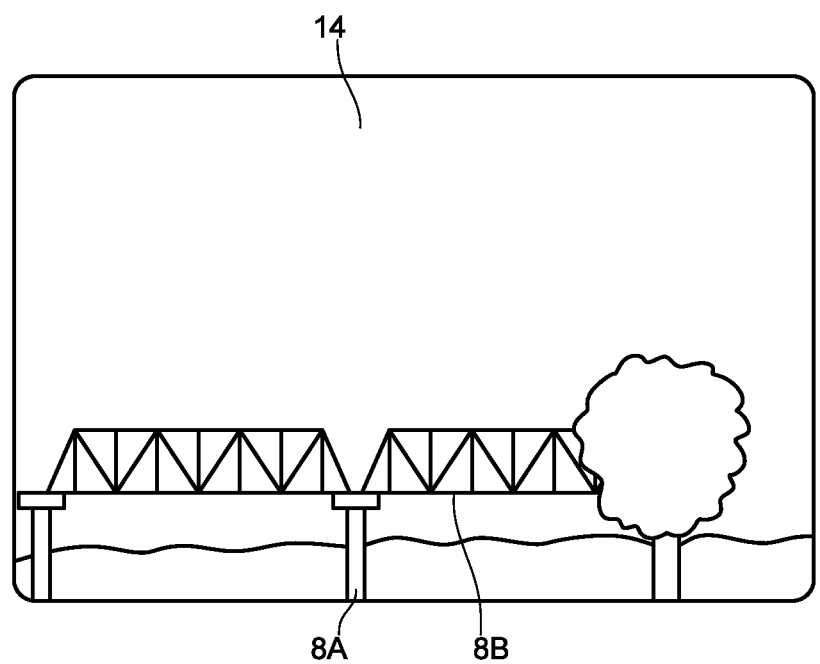
FIG. 9 illustrates a state where an AR object is combined with an image of foundations of a bridge.

Other exemplary displays of AR object 7 will be described with reference to FIGS. 8 and 9. FIG. 8 illustrates scenery displayed on the display device provided to the vehicle window. FIG. 8 illustrates foundations 8A (bridge girder) of a bridge under construction as exemplary scenery through the display. FIG. 9 illustrates a state where an AR object is combined with an image of the foundations of the bridge. Combining AR object 8B, which is a completed iron bridge, with actual foundations 8A enhances the sense of immersion of occupant 6 in the display information. In addition, it is possible to see the unfinished iron bridge through the display, which contributes to town revitalization (regional revitalization) to attract visitors and promote the community.

Figure 10:
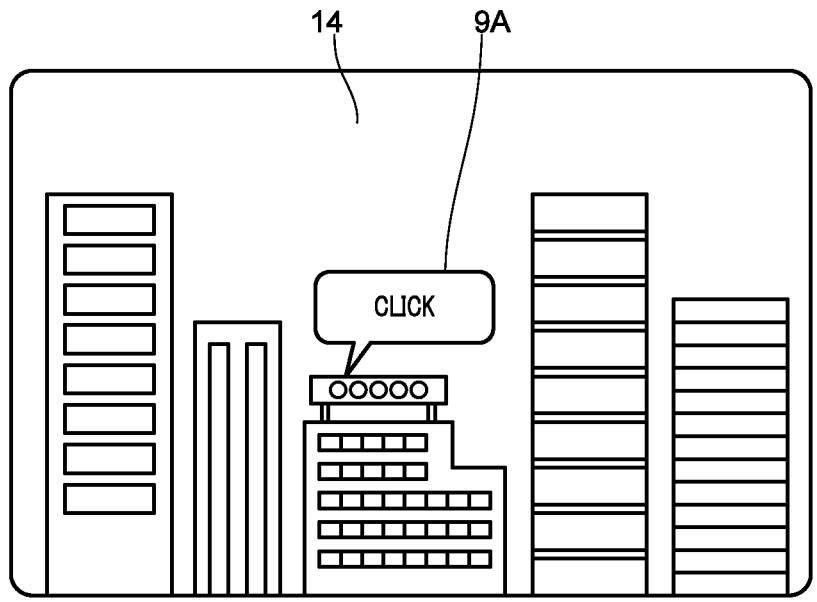
FIG. 10 illustrates an example of displaying an AR object icon in a townscape.
Figure 11:
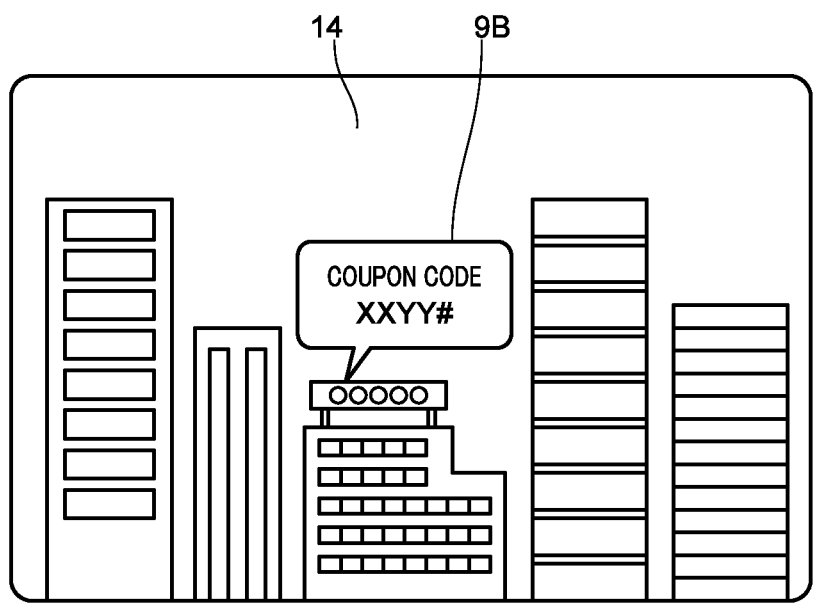
FIG. 11 illustrates an exemplary image of a coupon code that appears when the icon in FIG. 10 is operated.

FIG. 10 illustrates an example of displaying an AR object icon in a townscape. FIG. 11 illustrates an AR object related to a coupon code that appears when the icon in FIG. 10 is operated. For example, when an occupant clicks on icon 9A, AR object 9B related to a coupon code illustrated in FIG. 11 is displayed.

Displaying such AR object greatly enhances occupant's interest in the scenery through the display. This also greatly contributes to PR for a store and company, for example, and thus they can advertise their own products to passengers of a bus and the like without placing physical advertisements on actual buildings. This can also meet the need for a special advertisement only for a specific period, such as a period of the Olympic Games, since advertisements can be placed in various areas without placing physical advertisements on buildings; accordingly, purchasing power, customer attraction, etc. can be efficiently increased.

Note that AR object 9B is not limited to an object related to a coupon code, and may be, for example, a graphic or text representing the contents of a promotion carried out in a store, company, etc., or may be an object indicating the contents of word-of-mouth ratings of a store.

Further, the AR object may be, for example, an object newly created by not only a content production company but also an individual or advertiser, or a customized version of an existing AR object. For example, a dedicated application installed on a smartphone enables customized configurations for the design of the AR object, the display position of the AR object, the language displayed on the AR object, etc. The configured AR object is registered, for example, in map information (dynamic map, 3D high definition map, etc.) on center server 5 in association with the positions of a building, scenery, and the like. This map information is downloaded to the vehicle and display controller 26 compares the current position of the vehicle with the position in the map information. When the vehicle enters within a certain area from a particular building in the map information, the AR object is displayed on display device 14 in combination with a real object corresponding to the vehicle position. Such a configuration can be applied to not only the AR object but also the VR object, MR object, etc. Since the AR object can be freely customized, it is possible to create a hot spot by designing scenery with unique graphics that does not exist in other regions. A supplemental description will be given below for a method of displaying the VR object, MR object, etc. For example, the VR objects (objects close to reality or objects different from reality) are objects (buildings, roads, etc.) in a space where the vehicle travels placed in the whole 3D space virtually created (virtual 3D space). In addition, the MR objects in the above-described virtual 3D space are a person as character A and a motorcycle as character B placed based on sensing data of the positions and moving vectors of other moving bodies, such as a person, motorcycle, bicycle, etc., detected during autonomous driving, for example. Then, the VR object sand MR objects are displayed in accordance with the actual movement, and real information is displayed in the virtual space. At this time, the object placed in the virtual space close to the reality may be provided by the owner of the building in any form, for example.

The VR object, AR object, etc. can be changed based on traveling information on traveling of a moving body. The traveling information on traveling of a moving body includes, for example, speed of a vehicle (vehicle speed), weather around the current position of a vehicle, current time information, vehicle status information, traffic information, and information indicating a vehicle traveling mode. Specific examples of changing a virtual object based on the traveling information on traveling of a moving body will be described below.

In a case of changing a virtual object based on time, for example, the virtual object can be changed according to the time by using table information in which time periods, such as early morning, midnight, etc., are associated with virtual objects that are configured for the plurality of time periods and different for respective time periods. The table information may be stored in memory device 32B in advance or may be distributed from center server 5. For example, after the time information is inputted from a GPS or the like, display controller 26 refers to the table information, and displays an object with a pattern of the sun as illustrated in FIG. 7 on the surface of a mountain in the early morning. Meanwhile, display controller 26 displays an object with a pattern of the moon around the top of the mountain, for example, at midnight.

In a case of changing the virtual object based on the vehicle speed, display controller 26 uses table information in which the vehicle speed and the virtual object for each of a plurality of areas are associated with each other, for example. The table information may be stored in memory device 32B in advance or may be distributed from center server 5. After vehicle speed information is inputted, display controller 26 refers to the table information, and displays advertisements on buildings located in the surrounding area of the vehicle (e.g., area from the vehicle to several tens of meters) as the virtual objects, in a first speed range in which the vehicle speed is 20 km/h or less, for example. In a second speed range in which the vehicle speed exceeds 20 km/h, display controller 26 displays advertisements on buildings located in an area relatively far from the vehicle (e.g., area at least several tens of meters away from the vehicle) as the virtual objects. This allows an occupant to see the virtual objects near the vehicle when the vehicle travels at low speed. It is difficult to allow the occupant to see the virtual objects near the vehicle when the vehicle travels at high speed since the virtual objects pass through the window in a short time, but the occupant can see the virtual objects located in the area relatively far from the vehicle.

In a case of displaying virtual objects on a windshield or the like, for example, the virtual objects may be displayed while the vehicle is stopped, and may be hidden gradually, triggered by the release of a parking brake or other braking device, in order from an object in a section where attention needs to be paid while driving as the vehicle speed, acceleration, etc. increases. This makes it possible to provide advertisements and the like to the driver while preventing an accident caused by overlooking an obstacle around the vehicle traveling in a town.

Further, in the case of displaying virtual objects on a windshield or the like, virtual objects corresponding to the scenery of an area relatively far from the vehicle may be displayed when the vehicle is traveling on a bypass road, highway, or the like at a speed in the second speed range in the autonomous driving mode since the vehicle hardly needs to avoid an obstacle, and the objects may be hidden when the vehicle speed is reduced from the second speed range to the first speed range. This makes it possible to provide advertisements and the like to the driver while preventing an accident caused by overlooking an obstacle around the traveling vehicle even in a situation where the vehicle speed is low due to congestion or at a highway interchange.

In a case of changing the virtual object based on the weather, display controller 26 can change the virtual object using, for example, weather information distributed on the Internet, information of a windshield wiper operation state, information of a defogger operation state, and the like. For example, linking to a change in the people's preference due to the weather, it is conceivable to display an advertisement of a restaurant as a virtual object corresponding to the weather. In clear weather, for example, a virtual object related to a menu of rice dishes can be configured to be the advertisement of a restaurant, and in rainy weather, a virtual object related to a menu of noodle dishes can be configured to be the advertisement of a restaurant. This efficiently increases customer attraction, purchasing power, and the like without placing a physical advertisement on a building. This also provides more fun to an occupant of the vehicle for driving and sightseeing in rainy weather or cloudy weather.

In a case of changing the virtual object based on vehicle status information, for example, a plurality of table information portions are prepared for respective types of the vehicle status information, and each of the table information portions is associated with virtual objects with respect to accelerator opening, a brake depression amount, a steering amount of a steering wheel, for example. The table information may be stored in memory device 32B in advance or may be distributed from center server 5.

For example, when the vehicle travels on a highway at a constant speed and the accelerator opening is small accordingly, it is considered that the driver is relatively relaxed while driving. In this case, display controller 26 displays a virtual object as illustrated in FIG. 10. The same applies to cases where the brake depression amount is small, the number of times the steering wheel is steered in a certain time period is small, and the steering amount of the steering wheel in a certain time period is small.

In contrast, when the vehicle travels on a steep uphill with a series of curves such as a mountain road and the accelerator opening is large accordingly, it is considered that the driver feels more nervous while driving and feels more tired after driving. In this case, display controller 26 displays a driving-assist virtual object on display device 14 so that the object is superimposed on a road sign in a town. The driving-assist virtual object is, for example, an object to lead the driver to a roadside station, convenience store, gas station, charging station, etc. that are present around the current position of the vehicle, and a discount coupon code for drinking water. Note that such an object may be changed in real time according to the accelerator opening. The same applies to cases where the brake depression amount is large, the number of times the steering wheel is steered in a certain time period is large, and the steering amount of the steering wheel in a certain time period is large.

In a case of changing the virtual object based on traffic information, display controller 26 may change the virtual object on display device 14 depending on the traffic congestion status. To be more specific, when traffic information distributed while traveling on a highway indicates that the road on which the vehicle is expected to travel is congested for several minutes, the vehicle speed is considered to decrease for a short time. In this case, display controller 26 displays an AR object as illustrated in FIG. 7 so that the passenger can enjoy the virtual object corresponding to the scenery through the display. Meanwhile, when the road is congested for several tens of minutes or longer, it is assumed that low-speed traveling is forced for a relatively long time. In this case, display controller 26 displays, for example, a VR object that attracts the passenger's interest on the side window or the like. When a building present around the current position of the vehicle is under renovation, for example, a computer graphics image of the building before the renovation, a computer graphics image of the building after the renovation, and the like can be displayed as a VR object.

In a case of changing the virtual object based on information indicating a vehicle traveling mode, display controller 26 may change the virtual object depending on, for example, whether the vehicle is in a manual driving mode or an autonomous driving mode (including a driving assist mode, semi-autonomous driving mode, etc.). For example, display controller 26 displays an AR object as illustrated in FIG. 7 in a case of the manual driving mode, and displays a townscape VR object in a case of the autonomous driving mode.

Display controller 26 may also, for example, change the virtual object according to the attribute of an occupant. For example, in a case where an AR object of a cartoon character that is popular among children is embedded in a certain point in map information, display controller 26 recognizes the face of an occupant in the vehicle using captured image information and determines whether the occupant is a child. In a case where the occupant is a child, display controller 26 displays the AR object of the cartoon character on display device 14 when the vehicle approaches the point where the cartoon character is present on the map.

In addition, when a signboard inappropriate for children is present in a town, the actual signboard may be covered by a virtual object, or may be replaced with a virtual object of a character that children like, for example. To be more specific, for example, information of advertisements, signs, slogans, etc. that should be prohibited from being seen by children is registered in center server 5 in association with information of the ages, genders, nationalities, etc. of children. Then, table information associating such information portions is linked to the coordinates on the map. When there is a child corresponding to the registered condition among occupants of the vehicle approaching the point where such an advertisement is present, display controller 26 may cover the actual advertisement by a virtual object so as not to show the advertisement to the child. Display controller 26 may also analyze the direction of sight of the target child and cooperate with display position determiner 22 to display an alternative AR object of a cartoon character, for example, instead of a virtual object of an advertisement inappropriate for the child when such an object is present on the child's line of sight. Further, display controller 26 may cooperate with display position determiner 22 to display an alternative AR object, for example, when such an advertisement approaches the child's line of sight.

Note that display controller 26 may be incorporated in ECU 32, or may be incorporated in display device 14.

Figure 12:
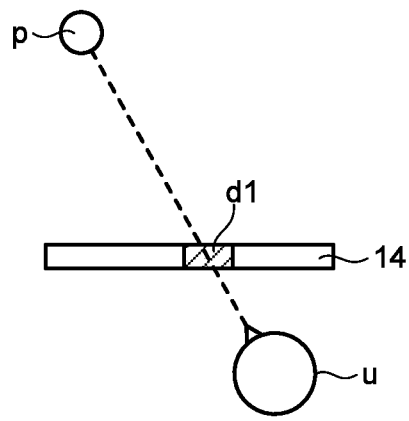
FIG. 12 is a diagram for describing an exemplary method of determining a display position.
Figure 13:
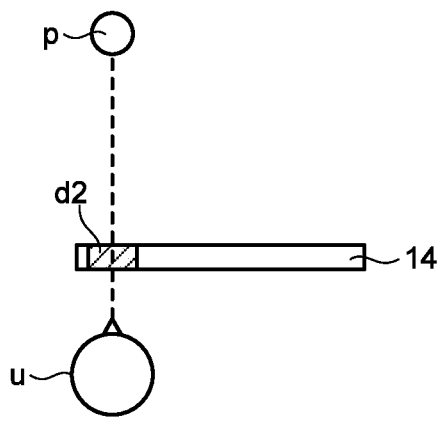
FIG. 13 is another diagram for describing an exemplary method of determining a display position.
Figure 14:
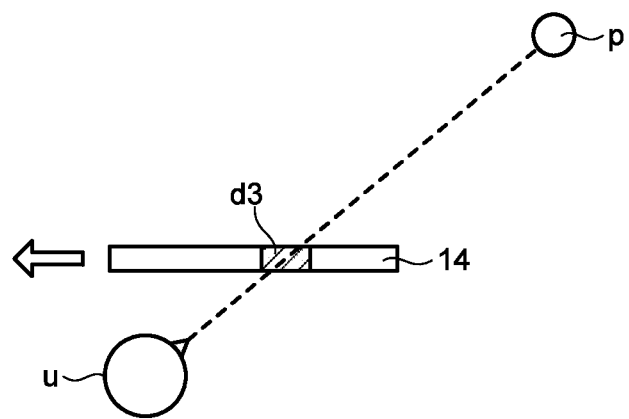
FIG. 14 is still another diagram for describing an exemplary method of determining a display position.

FIGS. 12 to 14 will be used for describing examples of displaying an AR object, for example, by aligning the direction of a person's line of sight with a real object.

FIGS. 12 to 14 are diagrams for each describing an exemplary method of determining a display position. Each of FIGS. 12 to 14 illustrates display device 14 provided to the vehicle window, occupant u watching display device 14 in the vehicle compartment, and position p. Position p is a position outside the vehicle with which the display information, such as an AR object, is associated in the scenery viewed by occupant u through display device 14.

FIG. 12 illustrates, for example, a case where occupant u in the vehicle is present in a position near the back of the right rear window of the vehicle, and from the position, sees right front position p outside the vehicle via display device 14. In this case, display position determiner 22 determines the display position of display information on display device 14 based on the position of occupant u, the position of display device 14, and position p.

In the following, the position of occupant u is referred to as an "occupant position", the position of display device 14 is referred to as a "screen position", and position p with which display information is associated is referred to as "information-associated position p".

In FIG. 12, display position determiner 22 determines the intersection point where the broken line connecting information-associated position p in the scenery and the occupant position intersects display device 14 as the center point of the display position of display information d1 associated with information-associated position p in the scenery.

Then, display position determiner 22 generates a display command indicating that display information d1 is displayed in the determined display position on display device 14, and inputs the display command to display controller 26. At this time, display position determiner 22 displays display information d1 (virtual object) in a display pattern according to the positional relationship between information-associated position p in the scenery and the occupant position. Note that display position determiner 22 may be configured to use a decorative display, flashing operation, sound effect, etc. for drawing attention to display information d1 on display device 14 in order to lead the line of sight by the sound and display before displaying display information d1 in a display pattern according to the positional relationship between information-associated position p in the scenery and the occupant position.

Next, as illustrated in FIG. 13, when occupant u moves to a position near the front of the right rear window of the vehicle, display position determiner 22 determines the intersection point where the broken line connecting information-associated position p in the scenery and the occupant position intersects display device 14 as the center point of the display position of display information d2 associated with information-associated position p in the scenery.

Display position determiner 22 then generates a display command indicating that display information d2 (virtual object) is displayed in the determined display position, and inputs the display command to display controller 26. The display pattern of display information d2 is different from the display pattern of display information d1 in FIG. 12.

After that, as the vehicle travels forward, information-associated position p in the scenery moves to the right rear side of the vehicle relatively. In this case, display position determiner 22 determines the intersection point where the broken line connecting information-associated position p in the scenery and the occupant position intersects display device 14 as the center point of the display position of display information d3 associated with information-associated position p in the scenery.

Then, display position determiner 22 generates a display command indicating that display information d3 (virtual object) is displayed in the determined display position on display device 14, and inputs the display command to display controller 26. The display pattern of display information d3 is different from the display pattern of display information d2 in FIG. 13.

As described above, display position determiner 22 determines a position overlapping information-associated position p in the scenery as seen from occupant u as a display position of a virtual object on display device 14, based on the occupant position, the screen position, and information-associated position p. Then, display position determiner 22 generates a display command indicating that the virtual object in a display pattern according to the positional relationship between information-associated position p in the scenery and the occupant position is displayed in the determined display position on display device 14, and inputs the display command to display controller 26.

This makes it possible to display an AR object or the like in a display pattern as if it is present in real information-associated position p seen through display device 14, thereby enhancing the occupant's sense of immersion in the scenery through the display without feeling unnatural.

Figure 15:
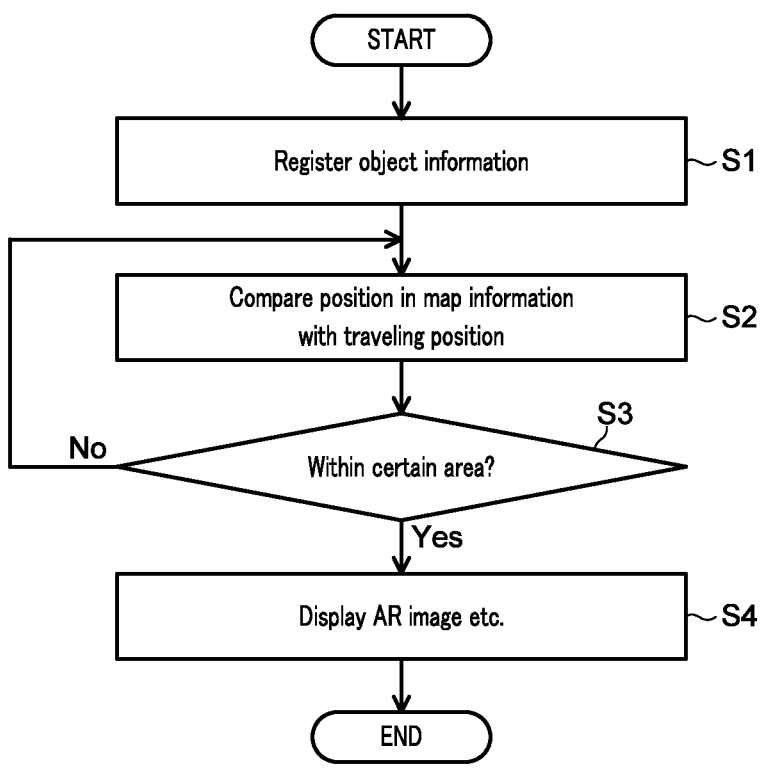
FIG. 15 is a flowchart for describing a display method of the display system.

FIG. 15 is a flowchart for describing a display method of the display system. In display system 1, a virtual object is registered first (step S1). To be more specific, an advertiser, individual, or the like who desires to retouch an object creates anew virtual object or freely customizes a virtual object configured along a vehicle traveling route by using a dedicated application installed on a smartphone, mobile terminal, or the like. This allows for the configuration of a new virtual object, retouched virtual object, etc. Note that the customization includes, for example, adding a virtual advertisement to a captured image of an existing building, and depicting the entire building as a fictitious building by computer graphics. A virtual pattern, virtual character, and the like may be added to the captured image of the existing building. The customized object is registered, for example, in map information on center server 5 in association with the positions of a building, scenery, and the like.

Next, display controller 26 that has downloaded the map information compares the position in the map information with the current position of the vehicle (step S2). When the vehicle does not enter within a certain area from a particular building on the map (No in step S3), display controller 26 repeats the processing of step S2 and the subsequent steps. When the vehicle enters within the certain area from the particular building on the map (Yes in step S3), display controller 26 displays an AR object on display device 14 in combination with, for example, a real building corresponding to the vehicle position. In addition, display controller 26 displays a VR object so as to be superimposed on a real building (step S4).

Note that the virtual object may change its motion or shape in accordance with the speed, the traveling position, and the like of a moving body. Display system 1 may be configured to allow for selection of a plurality of virtual objects when the passenger mobile terminal application (payment application) is operated or an icon displayed on the window is touched. In addition, display device 14 is not limited to a device with the transparent changing function, and may be a device without the transparency changing function.

As described above, a display device according to the present embodiment is configured to include: a display that is provided to a window of a moving body; and a display controller that controls displaying, on the display, of a virtual object corresponding to an object seen through the display from inside of the moving body, based on a positional relationship between the object and the moving body. This configuration makes it possible to incorporate, for example, an advertisement and an AR object that is freely arranged by a user into the scenery seen through the display while maintaining the old scenery of the town. Thus, it is possible to create unique scenery in a short period of time and create a hot spot without spoiling the townscape in an area where a regional revitalization effort is underway and an area where a landscape ordinance strictly restricts advertisements. In a case of a town with few tourism resources, in particular, configuring a rare character displayed only on a window of a moving body can promote the use of a passenger car, bus, taxi, etc. In addition, it is possible to expect an increase in the number of tourists by thinking out the scenery through the display, thus improving the ability of an accommodation facility, entertainment facility, etc. to attract more visitors. As described above, providing value-added information to an occupant of a moving body can improve competitiveness of an area and promote and strengthen employment.

In addition, a display method according to the present embodiment includes: determining a display position in displaying, on a display provided to a window of a moving body, a virtual object corresponding to an object seen through the display from inside of the moving body, based on a positional relationship between the object and the moving body; and displaying the virtual object in the display position.

While various embodiments have been described with reference to the drawings herein above, the present disclosure is obviously not limited to these examples. Obviously, a person skilled in the art would conceive variations and modification examples within the scope described in the claims, and it is to be appreciated that these variations and modifications naturally fall within the technical scope of the present disclosure. Each constituent element of the above-mentioned embodiments may be combined optionally without departing from the spirit of the disclosure.

Although specific examples of the present embodiment have been described in detail, those are merely examples and it is not intended to limit the scope of the claims. The techniques described in the claims include variations and modifications of the specific examples described above.

While various embodiments have been described herein above, it is to be appreciated that various changes in form and detail may be made without departing from the spirit and scope of the inventions(s) presently or hereafter claimed.

This application is entitled and claims the benefit of Japanese Patent Application No. 2020-050764, filed on Mar. 23, 2020, the disclosure of which including the specification, drawings and abstract is incorporated herein by reference in its entirety.

INDUSTRIAL APPLICABILITY

An exemplary embodiment of the present disclosure is suitable for a display device and a vehicle.

REFERENCE SIGNS LIST

1 Display system
3 Moving body
4 Mountain
5 Center server
6 Occupant
7 Object
8A Foundation
8B Object
9A Icon
9B Object
14 Display device
14a Electronic transparency control film
22 Display position determiner
26 Display controller
30 On-board device
32A Auxiliary storage device
32B Memory device
32D Interface device
33 GPS module
34 ACC switch
35 Sensor
36 Image capturing device
51 Communication device
52 Information processing apparatus
321 Vehicle information transceiver
323 Captured image information manager
520 Storage
5201 Communication processor
5205 Information display object extractor
5212 Vehicle identifier
5213 Command transmitter
5214 Map matcher
5215 Probe information generator

The invention claimed is:

1. A display device, comprising:
a display that is provided to a moving body; and
a display controller which, in operation, controls displaying, on the display, of virtual objects corresponding to objects visible through the display from an inside of the moving body, based on a positional relationship between the objects and the moving body, wherein
the display controller displays, on the display, a first virtual object corresponding to a first object existing within a predetermined distance from the moving body while the moving body is in a first speed range, and displays, on the display, a second virtual object corresponding to a second object existing further than the predetermined distance from the moving body while the moving body is in a second speed range where a vehicle speed is faster than the first speed range, and the display controller, in operation, controls displaying, on the display, of the virtual objects corresponding to the objects when the moving body is traveling in an autonomous driving mode in the second speed range, and controls hiding, on the display, of the virtual objects when the vehicle speed reduces from the second speed range to the first speed range.

2. The display device according to claim 1, wherein each of the first virtual object and the second virtual object is an augmented reality object.

3. The display device according to claim 2, wherein the display controller, in operation, adds the augmented reality object to each of the first object and the second object visible through the display.

4. The display device according to claim 3, wherein the display controller, in operation, superimposes the augmented reality object on each of the first object and the second object visible through the display.

5. The display device according to claim 3, wherein the display controller, in operation, displays the augmented reality object in a position of each of the first object and the second object visible through the display.

6. The display device according to claim 2, wherein the augmented reality object is an object resulting from retouching an object in real space.

7. The display device according to claim 2, wherein the display controller, in operation, displays the augmented reality object in a direction of a line of sight of an occupant of the moving body, the line of sight being toward scenery visible through the display.

8. The display device according to claim 1, wherein the virtual objects are virtual reality objects.

9. The display device according to claim 8, wherein the virtual reality objects result from retouching objects in real space.

10. The display device according to claim 1, wherein the virtual objects are related to advertisements.

11. The display device according to claim 1, wherein the virtual objects are changed in accordance with an attribute of an occupant of the moving body.

12. A vehicle comprising the display device according to claim 1.

13. A display method, comprising:
determining a display position in displaying, on a display provided to a moving body, a virtual object corresponding to an object visible through the display from an inside of the moving body, based on a positional relationship between the object and the moving body; and displaying the virtual object in the display position, wherein in a first case that a speed of the moving body is in a first speed range, and a first object exists within a predetermined distance from the moving body, the virtual object is displayed at a first display position corresponding to the first object, in a second case that the speed of the moving body is in a second speed range where a vehicle speed is faster than the first speed range, and a second object exists further than the predetermined distance from the moving body, the virtual object is displayed at a second display position corresponding to the second object, and the display method further comprises:
controlling displaying, on the display, of the virtual object corresponding to the object when the moving body is traveling in an autonomous driving mode in the second speed range, and controlling hiding, on the display, of the virtual object when the vehicle speed reduce s from the second speed range to the first speed range.

14. The display method according to claim 13, wherein the virtual object is an augmented reality object.

15. The display method according to claim 14, further comprising:
adding the augmented reality object to one of the first object and the second object, with the augmented reality object being visible through the display.

16. The display method according to claim 15, further comprising:
superimposing the augmented reality object on one of the first object and the second object, with the augmented reality object being visible through the display.

17. The display method according to claim 15, further comprising:
displaying the augmented reality object in a position of one of the first object and the second object, with the augmented reality object being visible through the display.

18. The display method according to claim 14, wherein the augmented reality object results from retouching an object in real space.

19. The display method according to claim 14, further comprising:
displaying the augmented reality object in a direction of a line of sight of an occupant of the moving body, the line of sight being toward scenery visible through the display.

20. The display method according to claim 13, wherein the virtual object is a virtual reality object.

* * * * *